Feb. 3, 1942.　　J. L. HAMILTON　　2,271,820

LUBRICATED BEARING

Filed Nov. 6, 1939

INVENTOR:
JAMES L. HAMILTON
BY
Roy M. Eilers
ATTORNEYS.

Patented Feb. 3, 1942

2,271,820

UNITED STATES PATENT OFFICE 2,271,820

LUBRICATED BEARING

James L. Hamilton, Kirkwood, Mo., assignor to Century Electric Company, St. Louis, Mo., a corporation of Missouri Application November 6, 1939, Serial No. 302,983

1 Claim. (Cl. 308—187)

This invention relates to improvements in lubricated bearings. More particularly the invention relates to improvements in methods used to lubricate high speed bearings. It is an object of the invention to provide a simple and effective method of lubricating high speed bearings.

In the operation of high speed bearings, it is necessary that the bearing surfaces be protected from wear by the use of a suitable lubricant which is supplied to the bearing surfaces at a predetermined rate. In the case of ball and roller bearings, the balls and rollers must be lubricated during the operation of the bearing by a film of oil which will envelop the balls and rollers. The ball and roller bearings cannot be immersed in a bath of lubricating fluid and operated at high speeds because the balls and rollers will churn the oil into a foam and cause it to break down. In addition, the immersion of the rollers or balls in a bath of oil increases rather than decreases the frictional resistance in the bearing since the rollers and balls must push the oil from their path before they can rotate. Because of this, therefore, it is necessary to provide a method of lubricating high speed ball and roller bearings which will spray enough oil on the bearing surfaces and the balls and rollers to lubricate them, but will not spray on so much oil that the oil will either be churned into foam by the balls and rollers, or will impede the operation of the bearing. A bearing using this method of lubrication will adequately lubricate the balls, rollers, and bearing surfaces and will also prevent destruction of the lubricating qualities of the oil by churning and foaming. In addition, this method of lubrication will supply just enough lubricant to adequately protect the bearing surfaces and will not furnish so much oil that it will collect on the bearing surfaces and hinder the rotation of the shaft.

It is an object of the present invention, therefore, to provide a method of lubrication which will supply an adequate amount of oil to the bearing surfaces of a high speed bearing and will also prevent the amount of oil on the bearing surfaces from becoming excessive and decreasing the efficiency of the bearing.

In the operation of a high speed bearing, it is desirable to provide means to filter the lubricating fluid. This removes from the lubricating fluid any abrasives or other adulterants which might injure the bearing surfaces of the bearing. By filtering out these harmful materials, the life of the bearing surfaces will be prolonged and the efficiency of the bearing increased. It is an object of this invention to provide means to filter the oil used in high speed bearings.

It is advantageous in the operation of high speed bearings to provide a positive circulation of the lubricating fluid. This prevents the excessive churning of a part of the oil and the resultant breakdown of that part of the oil. The positive circulation of the oil continually presents a fresh supply of oil to the bearing surfaces and insures longer life for the oil used and longer life for the bearing. It is thus an object of the invention to provide positive circulation of oil in a bearing.

It is advantageous to provide an oil reservoir in a lubrication system because the use of a reservoir will obviate the necessity of frequent oiling. With a high speed bearing, it is advisable to use an oil absorbent material in the oil reservoir because the oil absorbent material regulates the rate of flow of oil from the reservoir to the rotating parts. The regulation of the flow of oil prevents the foaming and churning of the oil by the rotating parts, and increases the life of the oil used in the bearing.

Many lubricating systems use oil rings but there are many disadvantages to oil rings. They wear grooves in the shaft and make noise when operated at high speeds. Oil rings rely on the surface tension of the oil to spread the oil on the shaft and this is not as efficient as other means of circulating the oil. The applicant provides a slinger which does not depend on the surface tension of the oil, but throws oil directly onto the bearing surfaces. This provides a positive means of oiling the bearing surfaces independent of the surface tension of the oil. Other bearings make use of oil-throwing means but these slingers are objectionable because of several reasons. One is that they rotate in a bath of oil to pick up the oil which they throw and the rotation of the slinger in a bath of oil will cause the oil to be churned and to foam. This breaks down the oil, reduces its lubricating qualities, and shortens the life of the bearing. Some devices use slingers which are operated in conjunction with oil rings but the use of the oil ring is objectionable. The applicant avoids the objections outlined above by using a slinger which collects oil from an oil-absorbent material stored in an oil reservoir. This arrangement prevents the churning of oil by the slinger and yet supplies an adequate amount of oil to the slinger.

In some of the high speed bearings now in use, oil is introduced onto the bearing surfaces by the "crawling" action of the oil which is deposited on the shaft. Because of their design some bearings cannot use any other method of lubrication, but with ball and roller bearings other and better methods of lubrication are possible. The method which has been found to be the best is to throw the oil either directly into the bearing, or against other parts of the bearing and thereby cause it to be sprayed onto the bearing surfaces. This has been found to be more satisfactory than the methods which make use of the "crawling" action of the oil to lubricate the bearing surfaces because an oil pressure can be created which will cause a positive circulation of oil through the bearing.

In some of the lubricated bearings now in use, oil is led into the bearing and onto the bearing surfaces but no provision is made for oil which passes through the bearing. This prevents the attainment of a positive circulation of oil through the bearing which has been found to be advantageous. In many of the bearings, the oil is forced through the bearing and must pass through the bearing again in order to reach the oil reservoir. The oil must pass through the bearing twice as often in this type of bearing as it does where a by-pass is provided to return the oil to the reservoir. In some bearings a steady pressure of oil is exerted on one side of the bearing and no provision for an oil return made on the other. The operation of this bearing causes oil to move onto the bearing surfaces and collect there since the pressure of the one side and the absence of by-pass on the other side of the bearing prevent the circulation of the oil. The oil which collects on the bearing surfaces is trapped and receives an excessive amount of wear. This condition tends to shorten the life of the oil used in the bearing and to reduce the efficiency of the bearing. It is an object of the invention to provide means for returning the oil which passes through the bearing, to the oil reservoir without again passing through the bearing.

The invention possesses the advantage of being operable in any position whatever. The device on which the bearing is mounted may be set in any position and the oil will still circulate. This is accomplished by the use of oil filled wool in the passageways in the bearing. The wool absorbs the oil and by capillary action conducts it to the oil-throwing means. The design of the bearing makes it operative in all radial positions and in all positions where the shaft is tilted. This feature makes the bearing a versatile one suited to all types of machines.

Other objects and advantages of the invention will be shown and described in the specification, drawing, and accompanying claim.

The invention is described in preferred forms in the specification and drawing, but it is to be understood that the specification and drawing do not limit the invention and that the invention will be defined by the accompanying claim.

Figure 1:
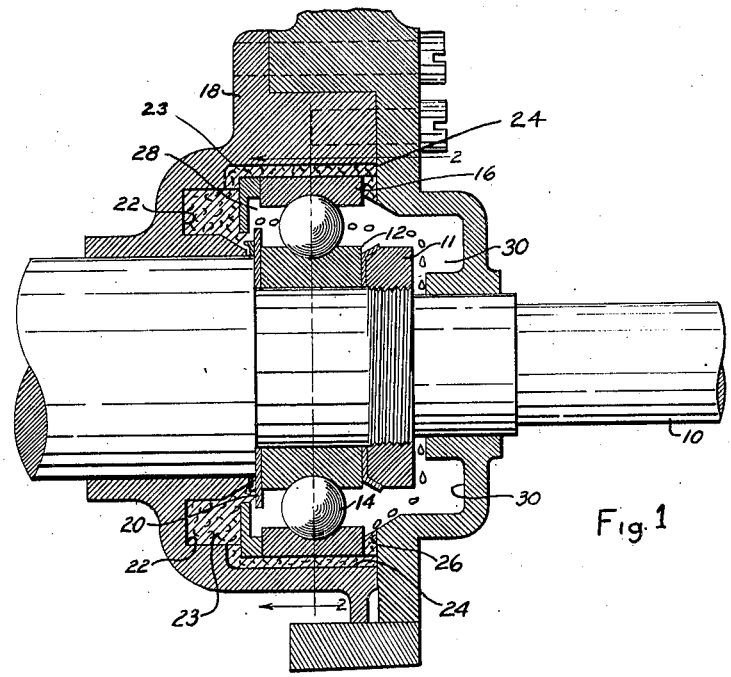
Fig. 1 is a longitudinal cross section of a bearing showing one form of the invention.

Referring to the drawing in detail in Fig. 1, a rotatable shaft is denoted by the number 10. Mounted on the rotatable shaft 10 is an inner race 12 which may be grooved to receive balls 14. An outer race 16 may also be grooved to receive the balls. The outer race 16 may be rigidly attached to the frame 18. A disc 20 which runs in a cavity 28 may be attached to the rotatable shaft 10. An oil absorbent material 23 is saturated with a lubricating fluid and placed in chamber 22. The amount of absorbent material 23 as well as the amount of oil placed in the chamber 22 may be varied to make the bearing better suited for different kinds of work. Operating conditions such as the temperature of the bearing and the length of time during which the bearing is operated, will determine the amount and character of oil absorbent material 23 used in the bearing. The viscosity of the oil used in the bearing will also affect the selection of the oil absorbent material 23 used in the bearing. A number of passageways 24 are located in frame 18 and connect the chamber 22 with passageways 26 which open into the chamber 30. In Fig. 1, a number of drops of oil have been shown to indicate the path of oil passing through the bearing when the bearing is operated. The oil is thrown from the discs 20, passes through the chamber 30, gravitates to the bottom thereof, and enters passageway 26 where the oil absorbent material 23 conducts it to the chamber 22.

Figure 2:
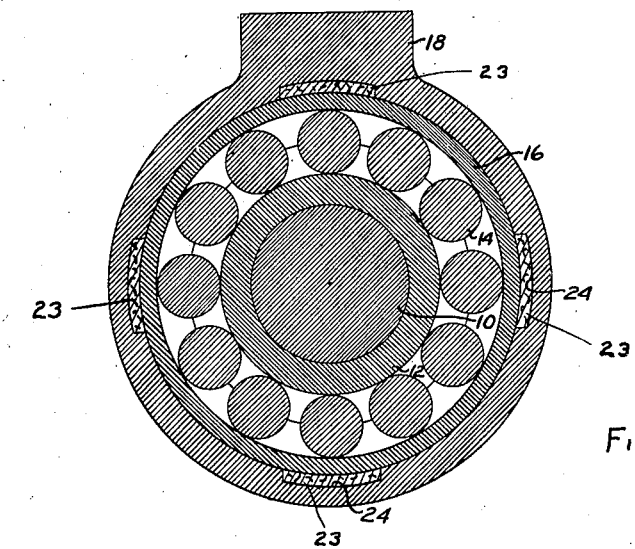
Fig. 2 is a cross section taken along plane 2—2 of Fig. 1.

Fig. 2 shows the arrangement of the passageways 24 in a preferred form of the invention. These may be located at intervals on the periphery of the frame 18 as shown. The passageways 24 are filled with oil-absorbent material 23 and conduct the oil from the chamber 30 to the chamber 22 where the oil-throwing means 20 picks it up. The oil absorbent material 23 will cause the oil to move from chamber 30 into chamber 22 even against the pull of gravity. As a result, oil will circulate even when the shaft is vertical.

The device is so designed that it does not require attention. The chamber 22 is filled with an absorbent material 23 and the absorbent material is then saturated with oil. A good absorbent material is wool, felt cloth, or fibers, but any suitable material may be used. This absorbent material contacts the rotating disc 20 and transfers oil to the disc, without any churning or foaming of the oil since the oil flows smoothly and freely from the oil absorbent material onto the surface of the slinger. The disc 20 rotates at high speed and the oil flies from its periphery. The oil which the slinger or disc 20 throws out, strikes the interior of chamber 28 and sprays onto the balls 14, the bearing surfaces of the inner race 12 and the outer race 16. As the shaft 10 continues to rotate, more oil is thrown onto the balls 14, the bearing surfaces of the inner race 12, and the outer race 16.

The continued rotation of the shaft 10 causes a pressure of oil on one side of the bearing and causes a flow of oil through the bearing. The oil which flows through the bearing, contacts the nut 11 and is thrown by centrifugal force into the chamber 30. The oil will then gravitate to the bottom of the chamber 30 and return to the oil reservoir 22 by means of pasageways 26 and 24. These passageways are placed at intervals around the periphery of the bearing so that the bearing will operate in whatever position the device is set. This permits the use of this type of bearing on devices of all kinds. As the oil flows through the absorbent material in chamber 22, it is filtered and all adulterants are thereby removed. The invention provides a positive circulation of oil by reason of the slinger 20 which throws the oil directly into the bearing. The positive circulation of oil thus provided prevents any portion of the oil from being subjected to excessive churning and foaming since fresh oil will force the oil on the bearing surfaces to move out. The oil which is forced to move out from the bearing surfaces will be thrown from the shaft by centrifugal force and will gravitate into the bottom of the chamber 30 where it will enter passageways 26 and 24, and be conducted back to the reservoir 22. As a result, the life of the oil used in such a bearing is longer than that of oil used in ordinary bearings. This promotes the long life of the bearing surfaces and makes the bearing more efficient.

Circulation of oil in this manner removes any fine metal fillings from the bearings and deposits them in the absorbent filter. This is an advantage which an oil-circulating system has over a non-circulating system since the latter type may provide a sufficient amount of oil on the bearing surface and yet make no provision for the removal of the small metal particles. These small particles will injure the bearing surfaces and shorten the life of the bearing.

By use of the invention, an efficient bearing is provided which has a long life and does not need frequent replenishing of the oil supply. In addition as previously set forth the circulating oil removes fillings or abrasives from the bearing and provides a cooling medium.

Whereas I have shown and described a preferred form of my invention, it is obvious to those skilled in the art that various changes and alterations may be made in the structure and form of the invention without altering its scope.

What I claim is:

In a lubricated bearing having inner and outer races and anti-friction means therebetween to rotatably support a shaft for operation in a substantially horizontal position a bearing support having an oil reservoir extending around the shaft at one side of the bearing, means extending between the bearing and reservoir and substantially spaced from the shaft to provide a constricted passageway therebetween, an oil throwing ring rotatable with the shaft extending outwardly beyond the inner race and across said passageway adjacent said means, an oil absorbent material filling said reservoir and passageway and contacting said ring, said bearing support being further provided with an unobstructed annular passage and chamber at the opposite side of the bearing and communicating therewith, and a plurality of circumferentially spaced passages extending from said reservoir to said chamber across said bearing, said absorbent material extending through each of said circumferentially spaced passages for returning oil to said reservoir.

JAMES L. HAMILTON.